US006619686B1

(12) United States Patent
Klar

(10) Patent No.: US 6,619,686 B1
(45) Date of Patent: Sep. 16, 2003

(54) FOLDING TOWBAR AND LOCK MECHANISM

(75) Inventor: Kenneth J. Klar, Portland, OR (US)

(73) Assignee: Jerry Edwards, Portland, OR (US)

( * ) Notice: Subject to any disclaimer, the term of this patent is extended or adjusted under 35 U.S.C. 154(b) by 20 days.

(21) Appl. No.: 09/924,818

(22) Filed: Aug. 7, 2001

(51) Int. Cl.$^7$ ................................................ B60D 1/54
(52) U.S. Cl. ................................. 280/491.3; 280/491.5
(58) Field of Search ......................... 280/491.1, 491.5, 280/491.3, 491.4, 480.1, 478.1

(56) References Cited

U.S. PATENT DOCUMENTS

| 2,378,504 | A | | 6/1945 | Roos |
|---|---|---|---|---|
| 2,880,016 | A | | 3/1959 | Peterson |
| 3,627,352 | A | | 12/1971 | Canole |
| 3,664,687 | A | | 5/1972 | Nutt, Jr. et al. |
| 4,073,508 | A | * | 2/1978 | George et al. .......... 280/478 R |
| 4,222,583 | A | | 9/1980 | Schillings |
| 4,273,352 | A | | 6/1981 | Jorgenson |
| 4,509,769 | A | | 4/1985 | Weber |
| 4,548,423 | A | * | 10/1985 | Craven ....................... 280/492 |
| 4,588,323 | A | | 5/1986 | Vollmer et al. |
| 4,768,803 | A | | 9/1988 | Hewitt et al. |
| 5,232,240 | A | * | 8/1993 | Johnson .................. 280/491.5 |
| 5,503,423 | A | * | 4/1996 | Roberts et al. .......... 280/491.3 |
| 5,765,851 | A | * | 6/1998 | Parent ..................... 280/491.4 |
| 5,873,595 | A | * | 2/1999 | Hinte ......................... 280/504 |
| 5,921,699 | A | | 7/1999 | Olson |
| 6,364,337 | B1 | * | 4/2002 | Rowland et al. ......... 280/491.3 |
| 6,409,201 | B1 | * | 6/2002 | Riehle ..................... 280/491.1 |
| 6,460,870 | B2 | * | 10/2002 | Moss ....................... 280/491.3 |
| 2002/0171225 | A1 | * | 11/2002 | Adair ...................... 280/491.5 |

* cited by examiner

Primary Examiner—Avraham Lerner
(74) Attorney, Agent, or Firm—Ryan A. Heck; Ian F. Burns & Associates

(57) ABSTRACT

A towbar for a vehicle. The towbar includes a yoke and a drawbar rotatably connected to the yoke. The drawbar is attached to the towing vehicle. A pair of connecting bars is attached to the yoke and to the vehicle being towed. A lock assembly is connected between the yoke and the to drawbar. The lock assembly is adapted to move from a first position in which the drawbar is free a to rotate and a second position in which the drawbar is retained to the yoke.

33 Claims, 6 Drawing Sheets

FOLDING TOWBAR AND LOCK MECHANISM

BACKGROUND OF THE INVENTION

1. Field of Invention

This invention relates to towbars that are used by one vehicle to tow another. More specifically the invention relates to a towbar that has a locking mechanism to retain the towbar in a folded position for storage when not in use.

2. Description of Related Art

Various towbars for vehicles have been designed that allow one vehicle to tow another. The towbars can be stored on the vehicle when not in use. U.S. Pat. No. 2,378,504, issued to Roos, discloses a towing device that can be tilted up when not in use. The hook of the bar is held to the hood of the vehicle by a strap that is placed around the bar. U.S. Pat. No. 2,880,016 issued to Peterson, discloses a combination grill guard and hitch. A coupler and bar are rotated upwardly toward the vehicle grill. A lock arm has to be manually pivoted allowing the bar to pass by. The lock arm is then manually lowered holding the drawbar in place. U.S. Pat. No. 4,509,769 issued to Weber, discloses a vehicle hitch. A coupler and bar are rotated upwardly toward the vehicle and a set screw is manually tightened to hold the bar in a stored position when not in use.

One problem with the prior art devices is that they require manual opening and closing of the lock or latch mechanism. When the bar is being lifted, it can be cumbersome and unwieldy for an operator to remove one hand from the bar and actuate the lock mechanism. Similarly the same problem occurs when the bar is being lifted. Another problem with the prior art devices is that the bar is not securely held by the lock or latch mechanism which leads to rattling and noise when the vehicle is driven.

What has long been needed is a towbar and lock mechanism that is easily locked and unlocked. Another long felt need is for a towbar and lock mechanism that securely retains the towbar so that it does not rattle or make noise when the vehicle is driven.

SUMMARY OF INVENTION

1. Advantages of the Invention

An advantage of the present invention is that it provides a towbar that is accessible for use and yet is readily secured for storage.

Another advantage of the present invention is that it provides a towbar that has a lock assembly.

A further advantage of the present invention is that it provides a towbar that can be folded away when not in use.

An additional advantage of the present invention is that it provides a towbar that has a spring loaded lock mechanism that self-engages in a locked position when rotated.

Yet another advantage of the present invention is that it provides a towbar with a lock that is easily released.

These and other advantages of the present invention may be realized by reference to the remaining portions of the specification, claims, and abstract.

2. Brief Description of the Invention

The present invention comprises a towbar for a vehicle. The towbar comprises a yoke and a drawbar rotatably connected to the yoke. A lock assembly is connected between the yoke and the drawbar. The lock assembly is adapted to be moved from a first position in which the drawbar is free to rotate and a second position in which the drawbar is retained to the yoke.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Towbar Assembly

Figure 1:
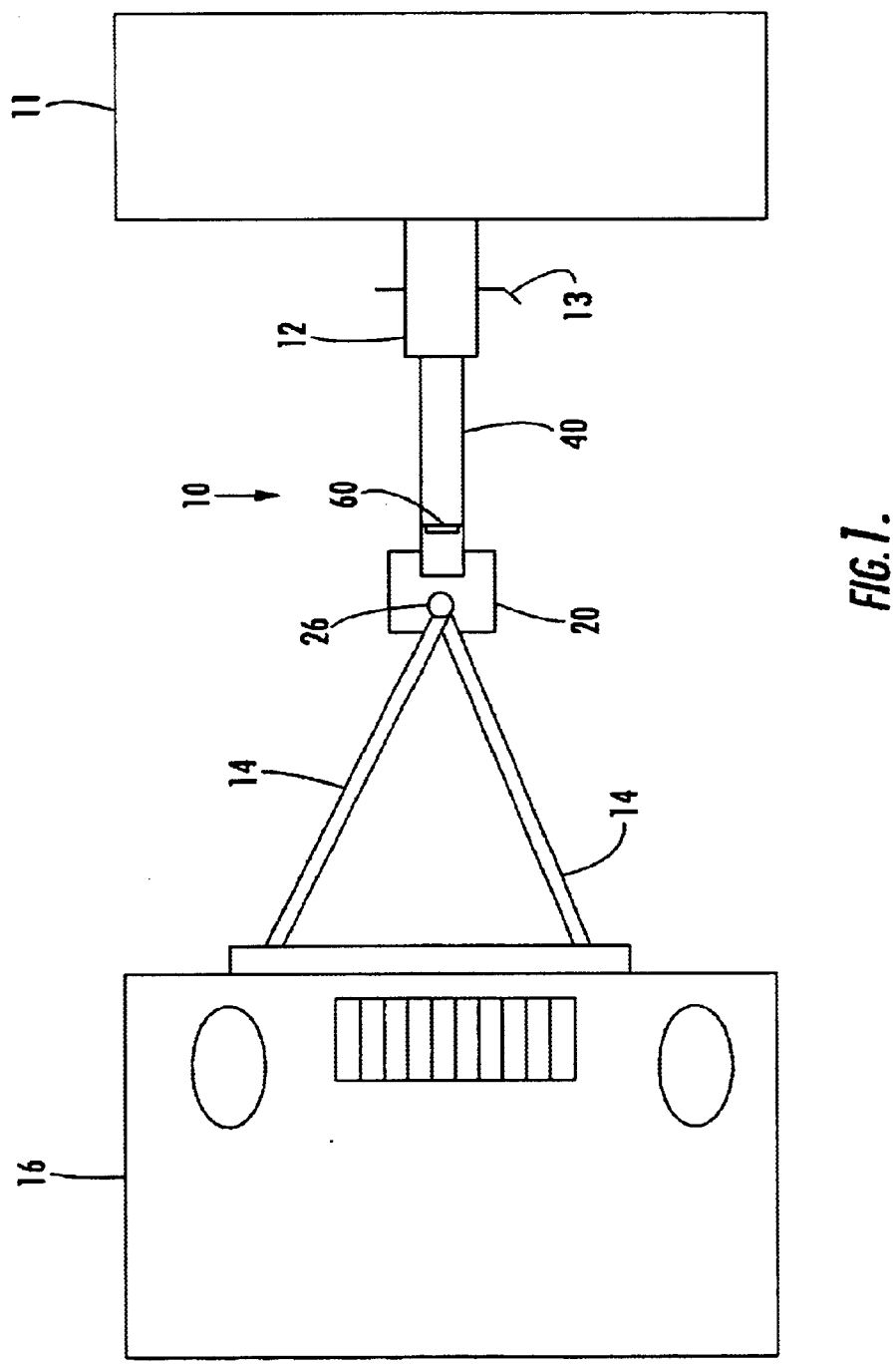
FIG. 1 is substantially a top view of the towbar assembly of the present invention in use between a towed vehicle and a towing vehicle.

Referring to FIG. 1, a towbar 10 is shown mounted between a towing vehicle 11 and a vehicle being towed 16. Towing vehicle can be almost any vehicle such as a car, truck or motorhome. Towing vehicle 11 has an attached conventional receiver hitch 12. Towed vehicle 16 can be almost any vehicle such as a car, truck or SUV that is desired to be towed. A typical application is a motorhome towing a car to be used once the motorhome is parked at a campsite. Towed vehicle 16 is attached to towbar 10 by a pair of removable rotating connecting bars 14. Connecting bars 14 are detached from towed vehicle 16 so that vehicle 16 may be driven. Connecting bars 14 pivot about a post 26. Towbar 10 has a drawbar 40 that is received into hitch 12. Drawbar 40 is held in hitch 12 by a hitch pin 13 that passes through apertures in hitch 12 and drawbar 40. Hitch pin 13 typically has a cotter key (not shown) to retain it in place. Towbar 10 has a yoke 20 that is rotatably attached to drawbar 40. Connecting bars 14 are rotatably connected to yoke 20.

Figure 2:
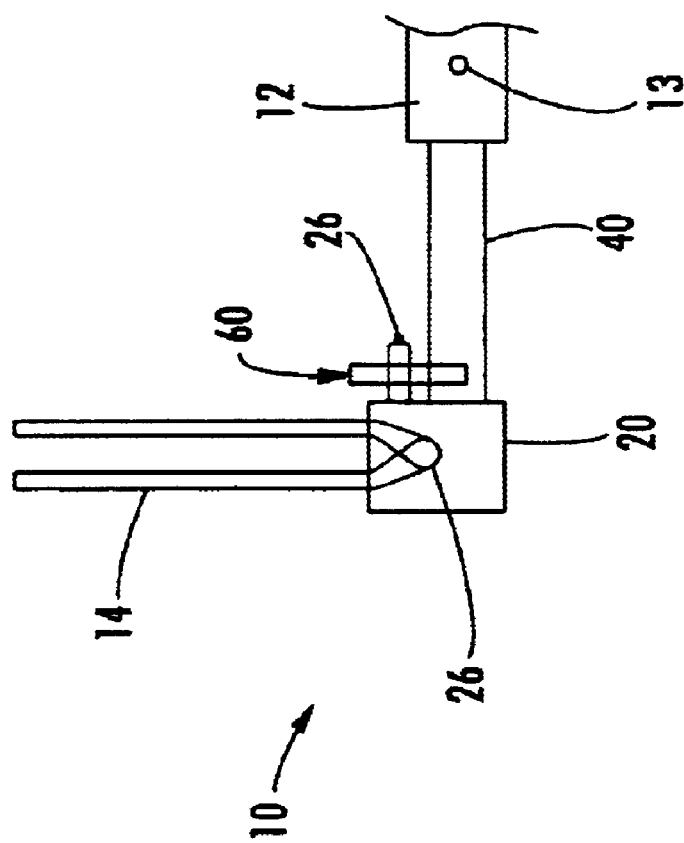
FIG. 2 is substantially a side view of FIG. 1 showing the towbar assembly in a folded position.
Figure 3:
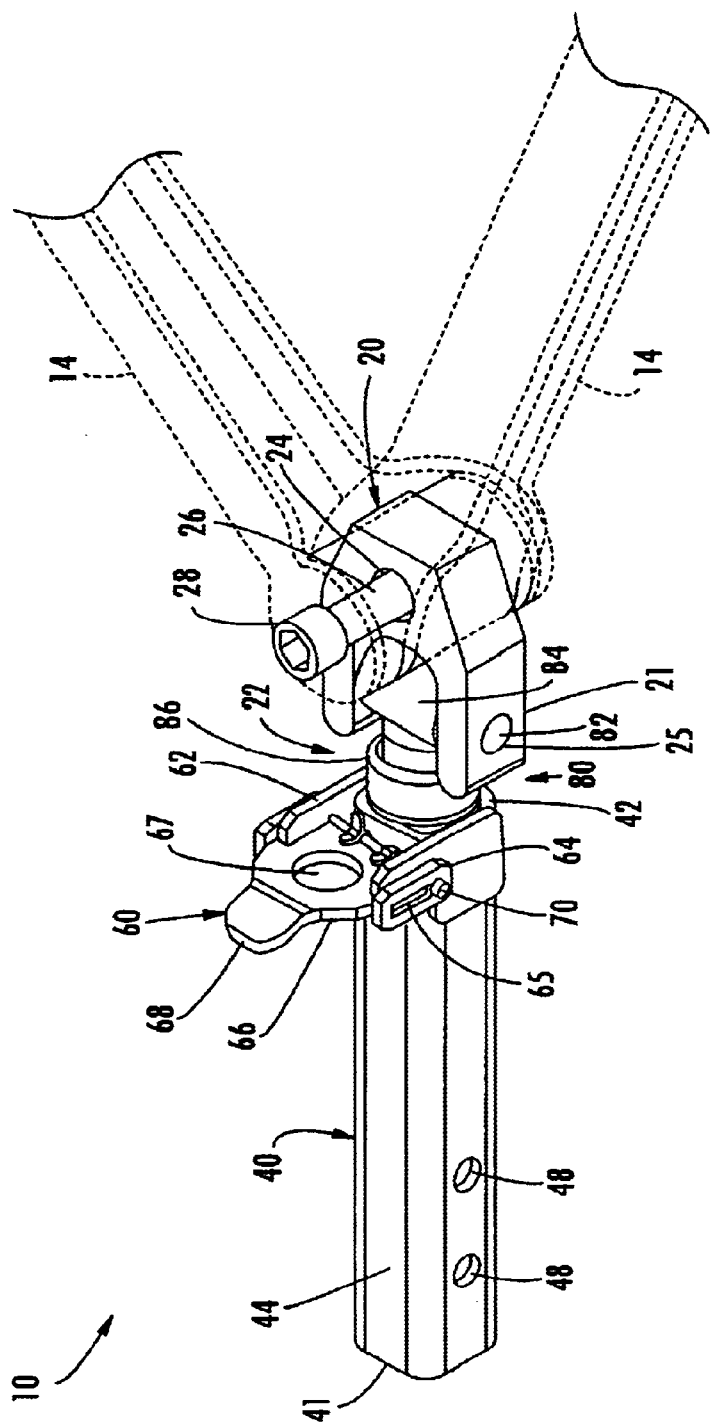
FIG. 3 is substantially a perspective view of the towbar assembly of the present invention in an unfolded position.
Figure 4:
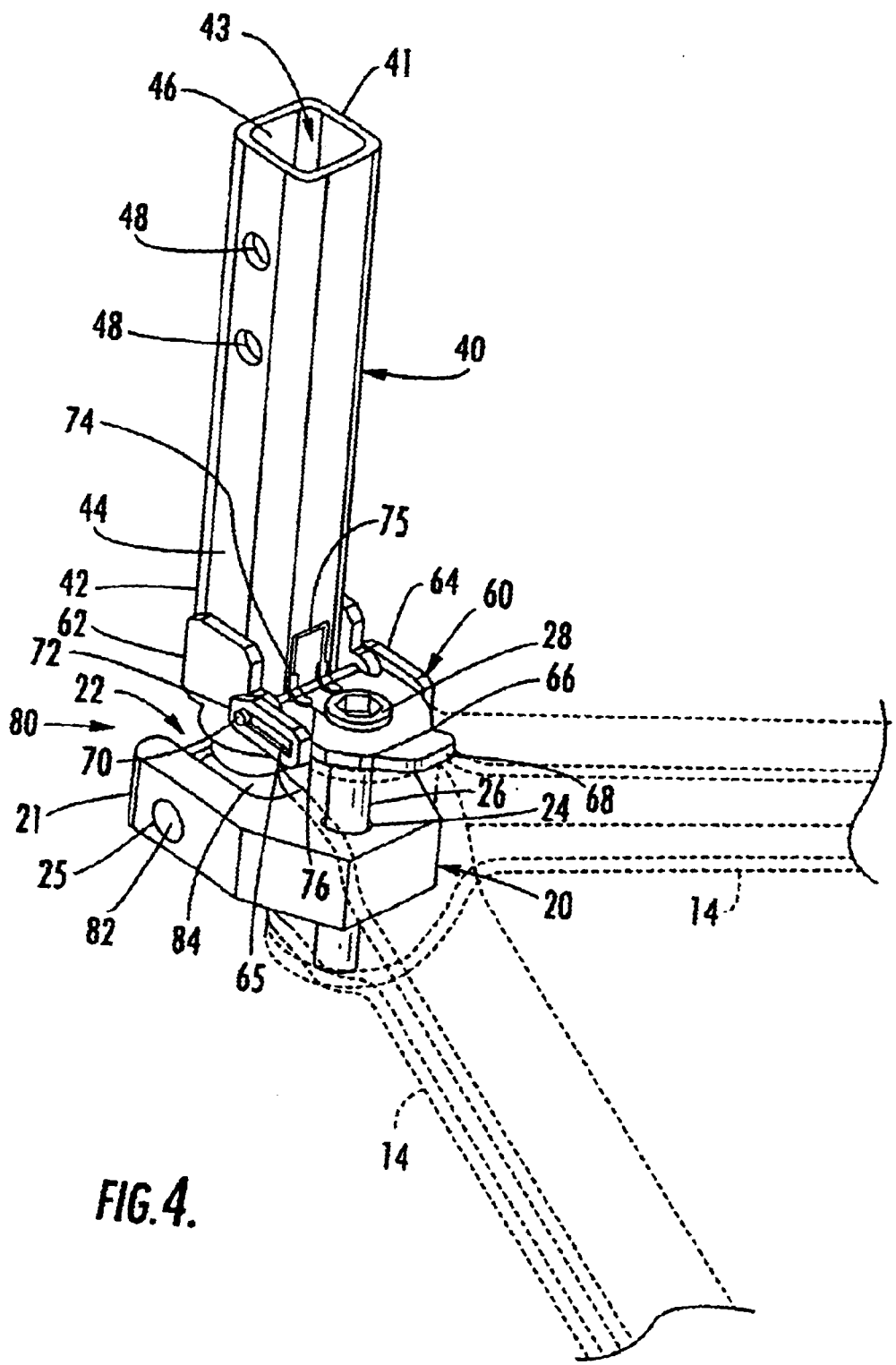
FIG. 4 is substantially a perspective view of the towbar assembly of the present invention in a folded position
Figure 5:
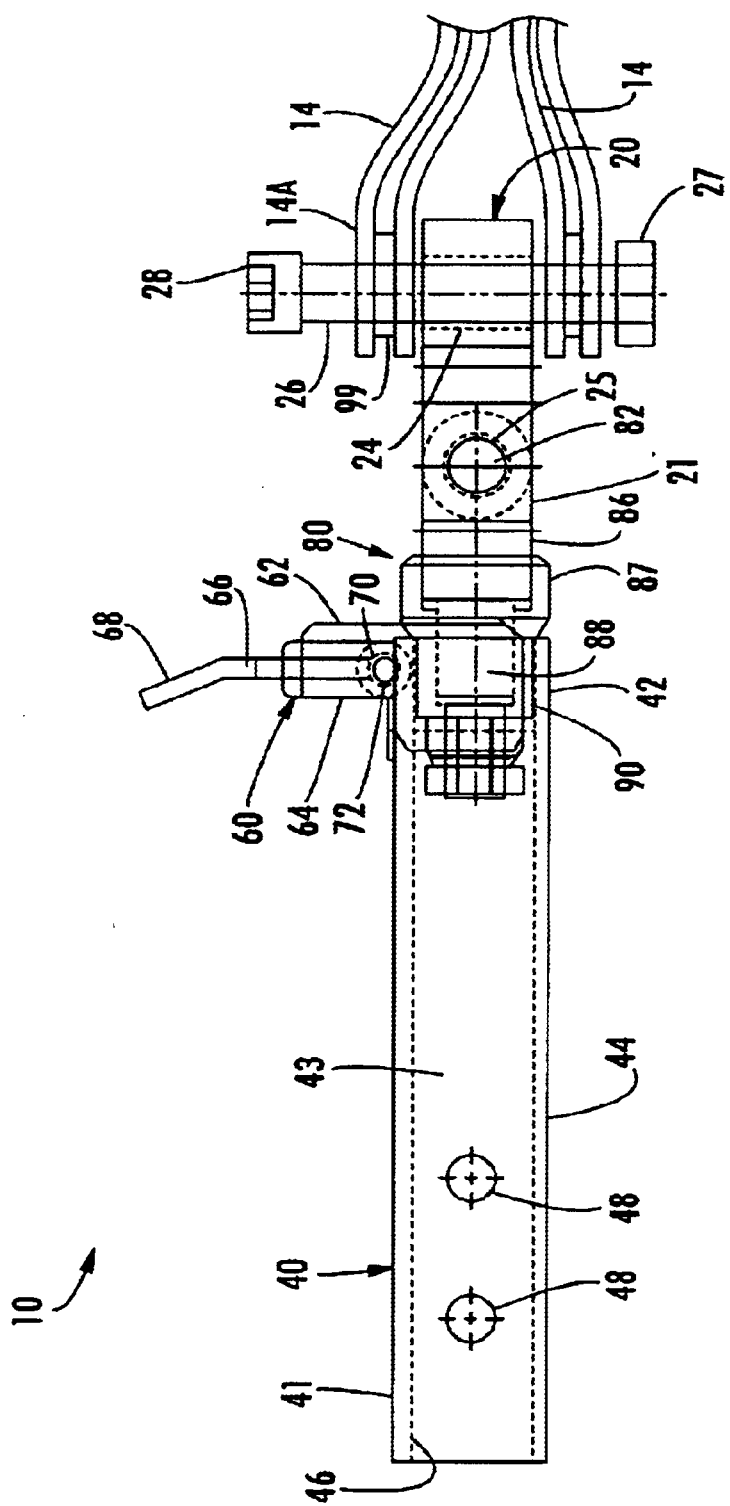
FIG. 5 is substantially a side view of the towbar assembly of in an unfolded position.
Figure 6:
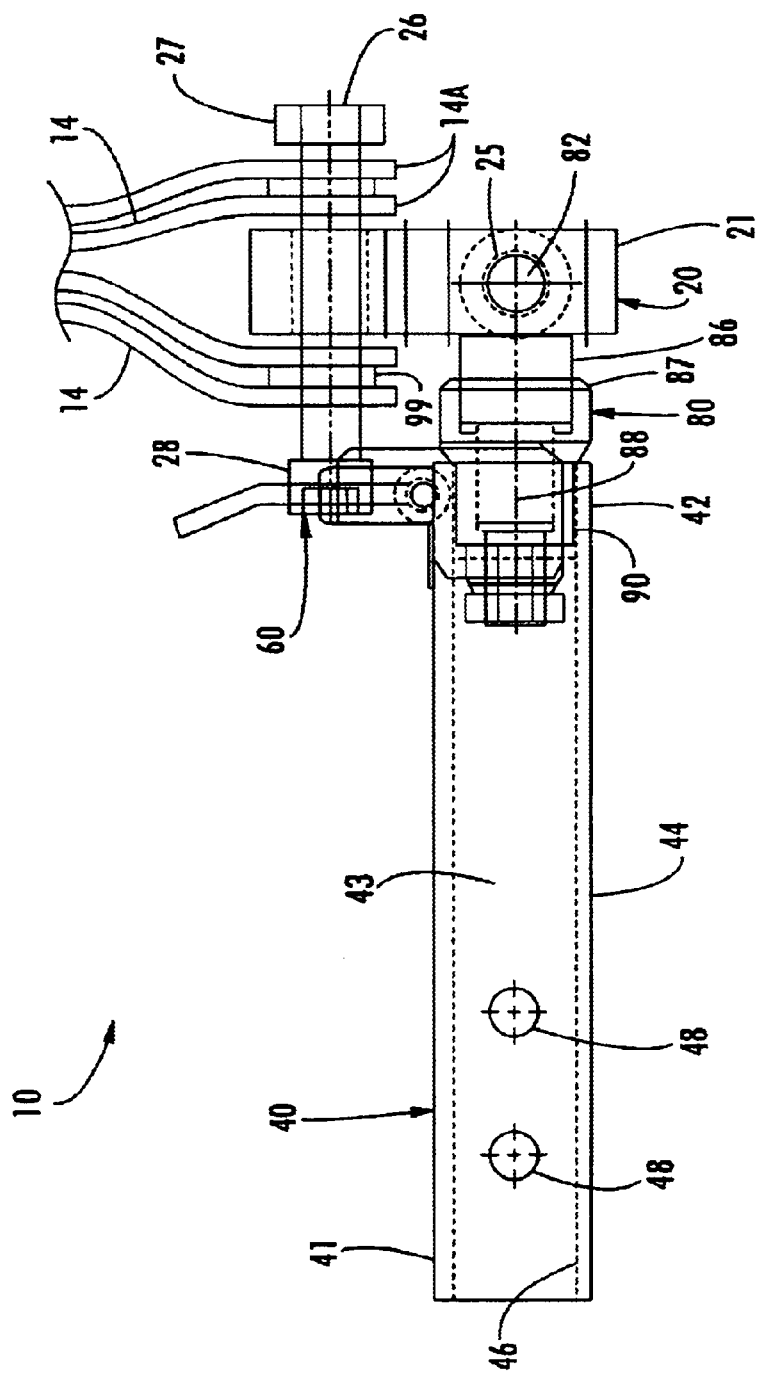
FIG. 6 is substantially a side view of the towbar assembly of in a folded position.

Turning now to FIG. 2, towbar 10 is shown in a folded position for storage when not in use. In FIG. 2, the connecting bars 14 have been disconnected from towed vehicle 16 and rotated into a storage position. Yoke 20 has also been rotated relative to the drawbar 40. A lock assembly 60 is attached to towbar 10. Lock assembly 60 retains yoke 20 to drawbar 40 once the yoke is sufficiently rotated. Lock assembly 60 engages a post 26 that extends from yoke 20. In the stored position, towbar 10 is securely held in place in a compact manner at the rear of towing vehicle 11.

Referring to FIGS. 3–6, a towbar 10 is shown in accordance with the present invention. Towbar 10 comprises connecting bars 14, a U shaped yoke 20, a drawbar 40, a lock assembly 60 and a rotary mechanism 80. U shaped yoke 20 has arms 21 that form a gap 22 between the arms. Yoke 20 has an aperture 24 that passes therethrough. A post 26 is retained in aperture 24 and has a head 28. Post 26 can be a threaded bolt that mates with a nut (not shown) or aperture 24 may be threaded. The height of post 26 is adjustable. Each arm 21 has a hole 25 extending therethrough. Yoke 20 can be machined from steel. Connecting bars 14 have holes (not shown) in Y-shaped end 14A that post 26 passes through and that allow bars 14 to pivot about post 26.

A nylon washer 99 can be used between ends 14A to reduce friction while pivoting the connecting bars 14. A threaded nut 27 mates with threads on post 26 to secure connecting bars 14 to the yoke 20.

A hollow elongated drawbar 40 comprises ends 41 and 42, a bore 43 extending the length of the drawbar, an outer surface 44, an inner surface 46 and a pair of holes 48. Drawbar 40 can be formed from welded steel tubing.

A drawbar 40 is connected with yoke 20 by a rotating mechanism 80. Rotating mechanism 80 comprises a first pin 82 and bushing 84, an arm 86, a collar 87 and a second pin 88 and bushing 90. Bushing 84 is located in gap 22 between arms 21. Pin 82 is press fit into holes 25 and passes through bushing 84. Pin 82 and bushing 84 can be formed from steel. Pin 82 can also be a bolt and nut. Pin 82 and bushing 84 allow drawbar 40 to pivot toward and away from yoke 20. Bushing 84 is connected to an arm 86, which extends into a collar 87. Inside collar 87 is a second pin 88 and second bushing 90. Second pin 88 and bushing 90 allow drawbar 40 to rotate about an axis parallel to the length of the drawbar.

A lock assembly 60 is connected to drawbar 40 and is engageable with post 26 to securely retain drawbar 40 to yoke 20 in a folded position. Lock assembly 60 comprises a pair of ears 62, a pair of lock nubs 64, a lock plate 66, a rod 70 and a torsion spring 74. Bars 62 are attached to outer surface 44 at drawbar end 42. Ears 62 can be formed out of steel and welded to drawbar 40. Ears 62 have an aperture (not shown) that passes through ear 62 above outer surface 44. A lock tab 64 has a slot 65 extending therethrough. Lock plate 66 rests adjacent to ears 62 and is rotatably supported by a rod 70. Lock tabs 64 are welded to each side of lock plate 66. Rod 70 passes through slot 65 and the aperture in ears 62. A snap ring or c-clip 72 is place on a groove (not shown) on each end of rod 70 to hold it in position. Rod 70 also passes through a torsion spring 74. Torsion spring 74 has a first end 75 that is rests against drawbar 40 and a second end 76 that is rests against lock plate 66. Rod 70 allows lock plate 66 to rotate. Spring 74 biases lock plate 66 toward post 26 when the drawbar is sufficiently rotated. Lock plate 66 has an aperture 67 and an angled projection 68. Angled projection 68 allows an operator or user to easily grasp the lock plate and lift the lock plate. When the yoke is rotated far enough, lock plate 66 will rotate toward post 26 and head 28 will pass through aperture 67 causing the drawbar to be held to the yoke in a folded position.

Operation

Towbar 10 connects between a towing vehicle and a vehicle being towed. For example, motor home owners find it desirable to have a smaller more maneuverable vehicle to use for transportation once the motor home is parked in a camping site. The motor home can tow a car or pickup truck to be used once the final destination has been reached by the motor home. Towbar 10 allows storage of the towbar after it has been disconnected from the vehicle being towed.

After connecting bars 14 have been disconnected from towed vehicle 16, bars 14 are rotated such that they are parallel to the rear of towing vehicle 11. Next, bars 14 and yoke 20 are rotated upwardly. When the yoke 20 is rotated far enough, lock plate 66 will contact head 28. Since lock plate 66 is spring loaded by spring 74 and is rotatable about rod 70, the lock plate will be displaced away from head 28. As the yoke 20 continues to rotate, aperture 67 will become aligned over head 28. With the spring 74 biasing lock plate 66 toward head 28, the lock plate will rotate and drop over head 28 such that head 28 resides within aperture 67. At this point, the yoke is securely held or locked to the drawbar in a folded position. The towing vehicle 11 can now be driven with the towbar 10 securely stowed for storage when not in use. The spring 74 helps to insure that the towbar stays in a locked position. For example, while driving down a rough road, vibration of the yoke could cause the lock mechanism to come loose. Spring 74 biases the lock plate 66 over head 28 and keeps the lock plate securely over head 28.

When it is desired to attach the towbar to vehicle being towed, the steps for storing the towbar are reversed. A user grasps the angled projection 67 and lifts lock plate 66 such that aperture 67 clears head 28. At this point the yoke 20 is free to rotate away from drawbar 40 into an unfolded position. Bars 14 are then rotated and reconnected with towed vehicle 16. Towed vehicle 16 is now ready for towing.

CONCLUSION

The present invention solves many of the problems associated with the prior art. The present invention provides a towbar that is readily accessible for use and yet is easily stored when not being used. The present invention provides a towbar that locks into a stored position. The present invention provides a towbar that is easily unlocked from a stored position when needed for use.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A towbar for a vehicle comprising;
   (a) a yoke;
   (b) a post extending from the yoke;
   (c) a drawbar rotatably connected to the yoke; and
   (d) a lock plate connected to the drawbar, the lock plate being adapted to engage the post when the drawbar is sufficiently rotated such that the drawbar is retained to the yoke.

2. The towbar according to claim 1, wherein the lock plate has an aperture therethrough, the aperture engaging the post when the drawbar is sufficiently rotated.

3. The towbar according to claim 1, wherein a spring biases the lock plate toward the post.

4. The towbar according to claim 1, wherein the post has a head and the lock plate is adapted to engage the head.

5. The towbar according to claim 3, further comprising:
 (a) a pair of ears attached to the drawbar;
 (b) a lock tab attached to the lock plate; and
 (c) a rod extending through the ears, the lock tab and the sprig.

6. The towbar according to claim 5, wherein the rod is retained by a snap ring.

7. The towbar according to claim 1, wherein the drawbar is adapted to be inserted into a receiver hitch.

8. The towbar according to claim 1, further comprising at least one connecting bar attached to the yoke, the connecting bar being adapted to be connected to a vehicle to be towed.

9. The towbar according to claim 1, wherein the drawbar is rotatably connected to the yoke by a first pin and bushing.

10. The towbar according to claim 1, wherein the drawbar is adapted to rotate about an axis parallel to the drawbar.

11. The towbar according to claim 10, wherein a second pin and bushing is located inside the drawbar, the second pin and bushing allowing rotation about the axis parallel to the drawbar.

12. The towbar according to claim 10, wherein an arm connects the first pin and bushing to the second pin and bushing.

13. A towbar for a vehicle comprising:
 (a) a drawbar;
 (b) a yoke rotatably connected to the drawbar, the yoke being rotatable from a first position substantially coplanar with the drawbar to a second position substantially transverse to the drawbar; and
 (c) a lock plate connected between the yoke and the drawbar, the lock plate being positioned substantially transverse from the drawbar, the lock plate being adapted to retain the yoke when the yoke is in the second position.

14. The towbar according to claim 13 wherein the lock assembly further comprising:
 (a) a pair of ears attached to the drawbar, the lock plate rotatably supported by the ears; and
 (b) a post extending from the yoke, the lock plate engaging the post in the second position.

15. The towbar according to claim 14 further comprising:
 (a) a spring attached between the lock plate and the drawbar, the spring biasing the lock plate toward the post; and
 (b) a rod passing through the ears and the spring, the lock plate rotating about the rod.

16. The towbar according to claim 15, wherein the rod is retained by a snap ring.

17. The towbar according to claim 13, wherein the drawbar is adapted to be inserted into a receiver hitch.

18. The towbar according to claim 13, wherein the yoke is adapted to be connected to a connecting bar that is attached to a vehicle being towed.

19. The towbar according to claim 13, wherein the drawbar is rotatably connected to the yoke by a first pin.

20. The towbar according to claim 13, wherein the yoke is adapted to rotate about an axis perpendicular to the drawbar.

21. The towbar according to claim 20, wherein a second pin is located inside the drawbar, the second pin allowing rotation about the axis parallel to the drawbar.

22. The towbar according to claim 21, wherein the drawbar is rotatably connected to the yoke by a first pin, the yoke being adapted to rotate about an axis perpendicular to the drawbar, wherein an arm connects the first pin to the second pin.

23. The towbar according to claim 14, wherein the lock plate has an aperture therein and the post has a head, the aperture engaged with the head when the drawbar is in the second position.

24. A towbar attachable between a tow vehicle and a vehicle being towed, comprising:
 (a) a yoke;
 (b) a drawbar rotatably connected to the yoke; and
 (c) a lock assembly connected between the yoke and the drawbar, the lock assembly comprising:
  c1) a pair of ears attached to the drawbar;
  c2) a lock plate rotatably supported by the ears;
  c4) a post extending from the yoke, the lock plate engaging the post, and
  c5) a spring attached between the lock plate and the drawbar, the spring biasing the lock plate toward the post, the yoke retaining the drawbar when post is engaged with the lock plate.

25. The towbar according to claim 24, wherein a rod passes through the ears and the spring, the lock plate rotating about the rod.

26. The towbar according to claim 25, wherein the rod is retained by a snap ring.

27. The towbar according to claim 25, wherein the drawbar is adapted to be connected to the tow vehicle.

28. The towbar according to claim 25, wherein the yoke is adapted to be connected with the vehicle being towed.

29. The towbar according to claim 24, wherein the drawbar is rotatably connected to the yoke by a first pin and bushing.

30. The towbar according to claim 29, wherein the drawbar is adapted to rotate about an axis parallel to the drawbar.

31. The towbar according to claim 30, wherein a second pin and bushing is located inside the drawbar, the second pin and bushing allowing rotation about the axis parallel to the drawbar.

32. The towbar according to claim 31, wherein an arm connects the first pin and bushing to the second pin and bushing.

33. The towbar according to claim 24, wherein the lock plate has an aperture therein and the post has a head, the aperture engaged with the head.

* * * * *